United States Patent [19]

Patsiokas et al.

[11] Patent Number: 5,396,648
[45] Date of Patent: Mar. 7, 1995

[54] CHANNEL ACQUISITION METHOD AND APPARATUS FOR A COMMUNICATION SYSTEM

[75] Inventors: Stelios J. Patsiokas, Plantation; Thomas V. D'Amico, Boca Raton; Charles D. Suter, Lake Worth; Raul A. Pombo, Boca Raton, all of Fla.

[73] Assignee: Motorola, Inc., Schaumburg, Ill.

[21] Appl. No.: 74,696

[22] Filed: Jun. 8, 1993

Related U.S. Application Data

[63] Continuation of Ser. No. 703,428, May 17, 1991, abandoned.

[51] Int. Cl.$^6$ .............................................. H04Q 7/00
[52] U.S. Cl. ................... 455/34.1; 455/34.2; 455/54.2; 455/56.1; 379/59
[58] Field of Search ............... 455/33.1, 33.2, 33.3, 455/33.4, 34.1, 54.1, 54.2, 56.1, 34.2; 379/59, 60

[56] References Cited

U.S. PATENT DOCUMENTS

| | | | |
|---|---|---|---|
| 4,485,486 | 11/1984 | Webb et al. | 455/33.3 |
| 4,563,680 | 1/1986 | Nakajima et al. | 455/32.1 X |
| 4,783,780 | 11/1988 | Alexis | 455/33.3 |
| 4,797,948 | 1/1989 | Milliorn et al. | 455/54 |
| 4,853,972 | 8/1989 | Ueda et al. | 455/83 |
| 4,856,048 | 8/1989 | Yamamoto et al. | 455/33.2 |
| 4,881,271 | 11/1989 | Yamauchi et al. | 455/56.1 |
| 4,953,198 | 8/1990 | Daly et al. | 379/61 |
| 5,040,205 | 8/1991 | Kunihiro | 379/61 |
| 5,050,234 | 9/1991 | Ohteru | 455/34.1 |
| 5,119,508 | 6/1992 | Shamasundara | 455/234.1 |

OTHER PUBLICATIONS

CT2 Common Air Interface Version 1.1, Jun. 30, 1991 "Common air interface specification to be used for the interworking between cordless telephone apparatus in the frequency band 864.1 MHz to 868.1 MHz, including public access services" European Telecommunications Standards Institute, Valbonne Cedex France.

*Primary Examiner*—Edward F. Urban
*Attorney, Agent, or Firm*—Pedro P. Hernandez

[57] ABSTRACT

A method and apparatus whereby a communication unit (10) transmits a communication channel request and the nearest base site (12) makes the communication channel grant or allocation. A base site receives the channel request signal, measures the received signal strength (RSSI) level of the received signal, and if that level is above a threshold level, a communication channel is allocated to the requesting communication unit, thus establishing a communication link. If the channel request signal does not have an RSSI level above the threshold, the base site delays the grant of a communication channel for a period inversely proportional to the measured RSSI level to allow other base sites the opportunity to grant a communication channel to the requesting communication unit. If the base site determines that another base site has granted a communication channel to the requesting communication unit, the allocation process is stopped, and the base site continues scanning for channel request signals.

27 Claims, 4 Drawing Sheets

CHANNEL ACQUISITION METHOD AND APPARATUS FOR A COMMUNICATION SYSTEM

This is a continuation of application Ser. No. 07/703,428, filed May 17, 1991, and now abandoned.

TECHNICAL FIELD

This invention relates generally to communication systems and more specifically to radio telephone communication systems.

BACKGROUND

Radio telephone communication systems (such as second generation cordless telephone, or Digital European Cordless Telephone) comprise a plurality of base sites (also known as telepoints) and a plurality of radio telephones (also known as handsets). Taking second generation cordless telephone (CT2) as an example, the users of the CT2 radio telephones communicate with users of other radio telephones or subscribers in a public switched telephone network (PSTN) via the base points. A large number of base points is desirable in certain areas (such as shopping malls) where many persons are likely to place radio telephone calls because that eliminates gaps in coverage by the base site network. However, these base sites are not synchronized with each other. When a radio telephone user wishes to place a call, he or she causes the radio telephone unit to transmit a channel request signal. Since each base site is monitoring the channels of the CT2 system independently, the base site that grants the channel request is not necessarily the one closest to the radio telephone unit transmitting the channel request signal. That may be a problem because the user may move out of range of the base site, thus causing the communication link to be dropped. On the other hand, if the nearest base station had made the channel grant, the radio telephone user would have been able to continue the communication while moving in a greater area. Accordingly, a need exists for a method and apparatus for acquiring a communication channel that overcomes the above problem.

SUMMARY OF THE INVENTION

Briefly, according to the invention, a method and apparatus are provided whereby a communication unit transmits a communication channel request and the nearest base site makes the communication channel grant. A base site receives the channel request signal, measures the received signal strength (RSS) level of the received signal, and if that level is above a first threshold level, a communication channel is granted to the requesting unit, thus establishing a communication link. Then, the base site maintains the communication link as long as RSSI level does not drop below a second threshold level that is substantially lower than the first threshold level.

DETAILED DESCRIPTION OF THE PREFERRED EMBODIMENT

Figure 1:
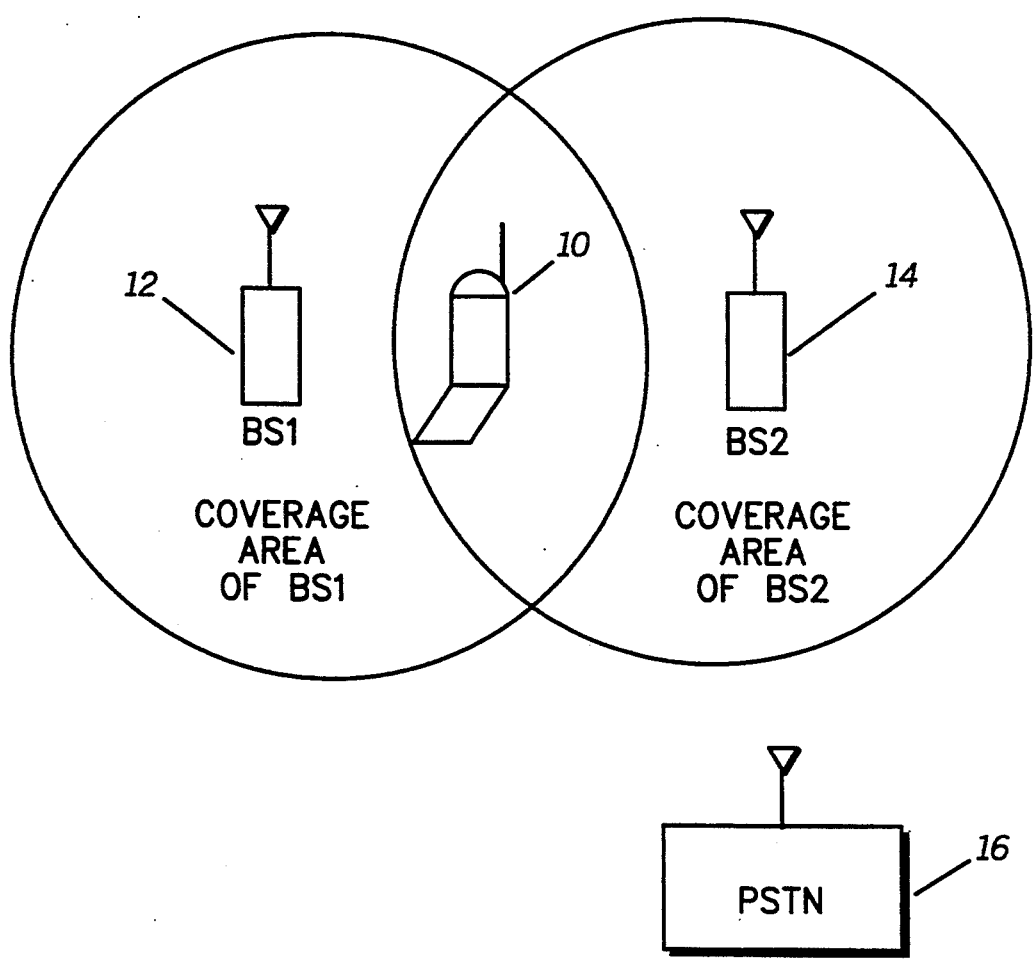
FIG. 1 is a simplified block diagram of a communication system in accordance with the invention.

Referring to FIG. 1, there is shown a simplified block diagram of a communication system in accordance with the invention. A communication unit 10 (preferably, a radio telephone) operates in a CT2 communication system that comprises at least first and second base sites, 12 and 14, respectively. The system may also comprise several other base sites, communication units, and a public switched telephone network (PSTN) 16. The communication unit 10 is closer to the first base site 12 than to the second base site 14. When the user of the communication unit 10 wishes to make a call, he or she causes the communication unit to transmit a channel request signal (which includes the unit's identification number) requesting a communication channel. The communication unit 10 is within the coverage areas (i.e., ranges) of both the first base site 12 and the second base site 14. Thus, in a conventional CT2 system, either of the base sites could grant a communication channel to the communication device, establishing a communication link. In the event that the second base site 14 is the first to receive the channel request signal, it would grant the channel to the communication unit 10. That would create a problem for the user of the communication unit 10 because if the user moves any further away from the second base site 14, the unit would move out of the range of the second base site 14 and consequently the communication link would be lost. However, in accordance with the invention the first base station 12 would be the one granting the communication channel to the communication unit 10, thus solving the problem that would have been caused by a more distant base site granting the communication channel.

Figure 2:
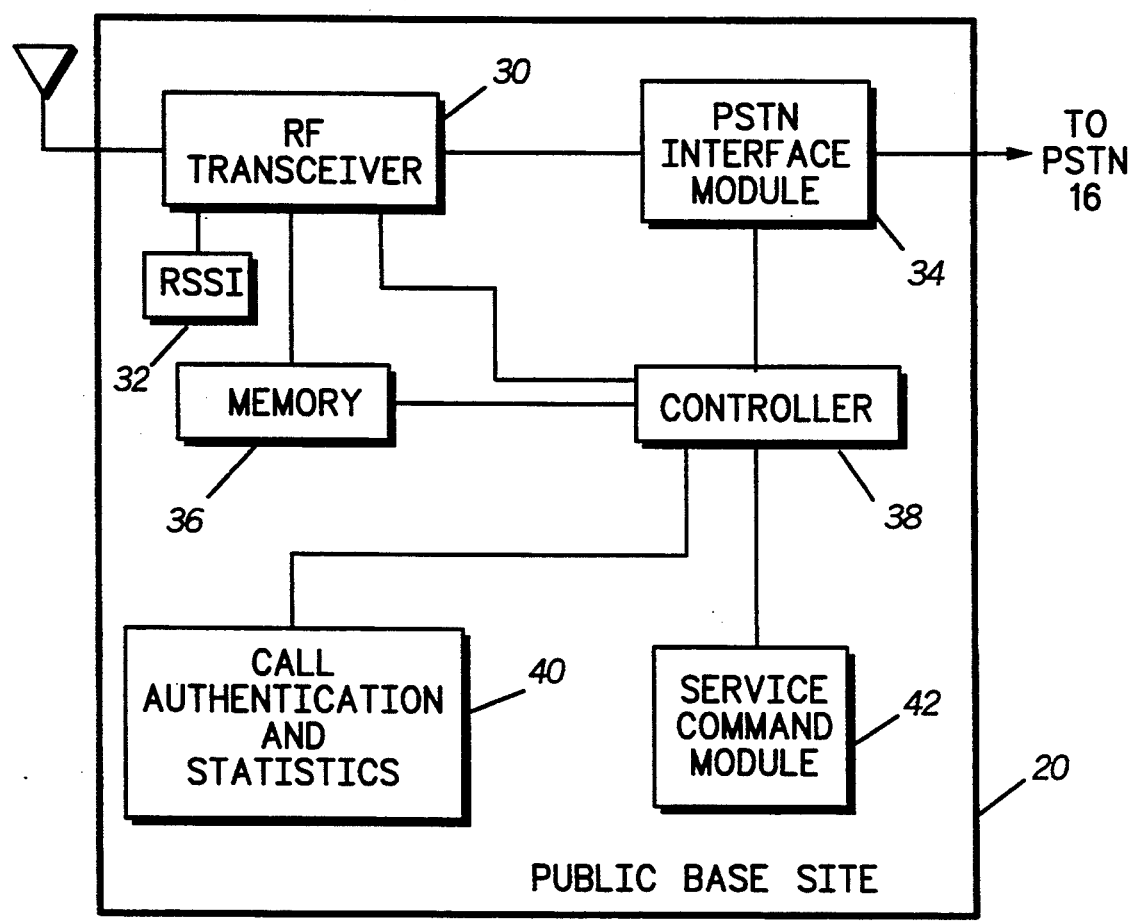
FIG. 2 is a simplified block diagram of a base site in accordance with the invention.

Referring to FIG. 2, a public base site (or wireless phonebooth) 20, in accordance with the invention, is shown in block diagram form. Each of the components of the base site 20 represented by a block is conventional. The base site 20, which is coupled to a network controller 38, comprises a radio transceiver 30, an RSSI detector 32, and a memory 36 for storing information (including the identification numbers corresponding to communication units sending channel request signals, and memory templates containing information relating to subscribers). The RSSI detector 32 is used to determine the RSSI level of signals received by the base site 20. The base site 20 also includes a controller 38 (e.g., a conventional microprocessor) which is capable of scanning the CT2 channels to search for channel request signals. The controller 38 also includes the capability for determining whether received signals have received signal levels (or strengths) at predetermined thresholds and may also include digital signal processing (DSP) capabilities for turning voice signals into digital form and processing those signals using well-known DSP methods. A module 40 provides call authentication and statistic functions for the base station 20, and a service command module processes requests for services and informs the network controller 18 what services are required. A PSTN interface module 34 provides an interface with the public switched telephone network 16 (shown in FIG. 1 ).

The base station 20 enables a communication unit to communicate with other communication units within the same or other communication networks, and to acquire access to any of the information and services available through the network controller. Moreover, since the base station 20 has its own memory, memory templates relating to a subscriber may be transferred to it, thus allowing the base station 20 to provide the requested services and/or information to the requesting subscriber without a continuous coupling to the network controller.

Figure 3:
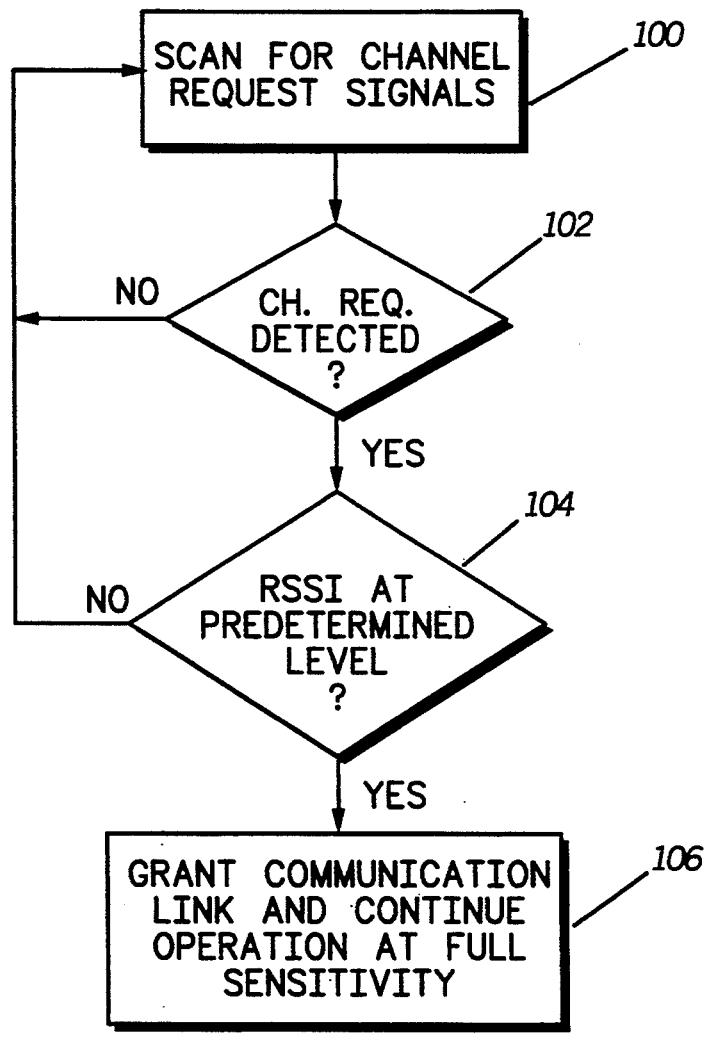
FIG. 3 is a flow chart of a channel acquisition method in accordance with the invention.

Referring to FIG. 3, there is shown a flow chart of a channel acquisition method in accordance with the invention. In step 100, a base site (e.g., base site 20) scans the CT2 channels for channel request signals. In decision 102, the base site determines whether a channel request signal is detected. The base site detects channel request signals having an RSSI level at or above a first threshold. The first threshold corresponds to the full sensitivity of the base site. If the base site detects a channel request signal in decision 102, then a further decision 104 is made to determine whether the RSSI level of the channel request signal is above a predetermined threshold level. The predetermined threshold level is a predetermined value of decibels above the maximum sensitivity level of the base site. That value is selected in accordance with the desired distance from the base site on which the communication channel is granted. For example, a distance of 15 meters or less from the granting base station may be desired. If the base site determines, in decision 104, that the RSSI level is at or above the second threshold, in step 106 it grants a channel to the requesting communication unit, thus establishing a communication link between the base site and the communication unit. The communication link is maintained as long as the signals received from the communication unit do not drop below the first threshold. The base site then continues scanning at full sensitivity.

Figure 4:
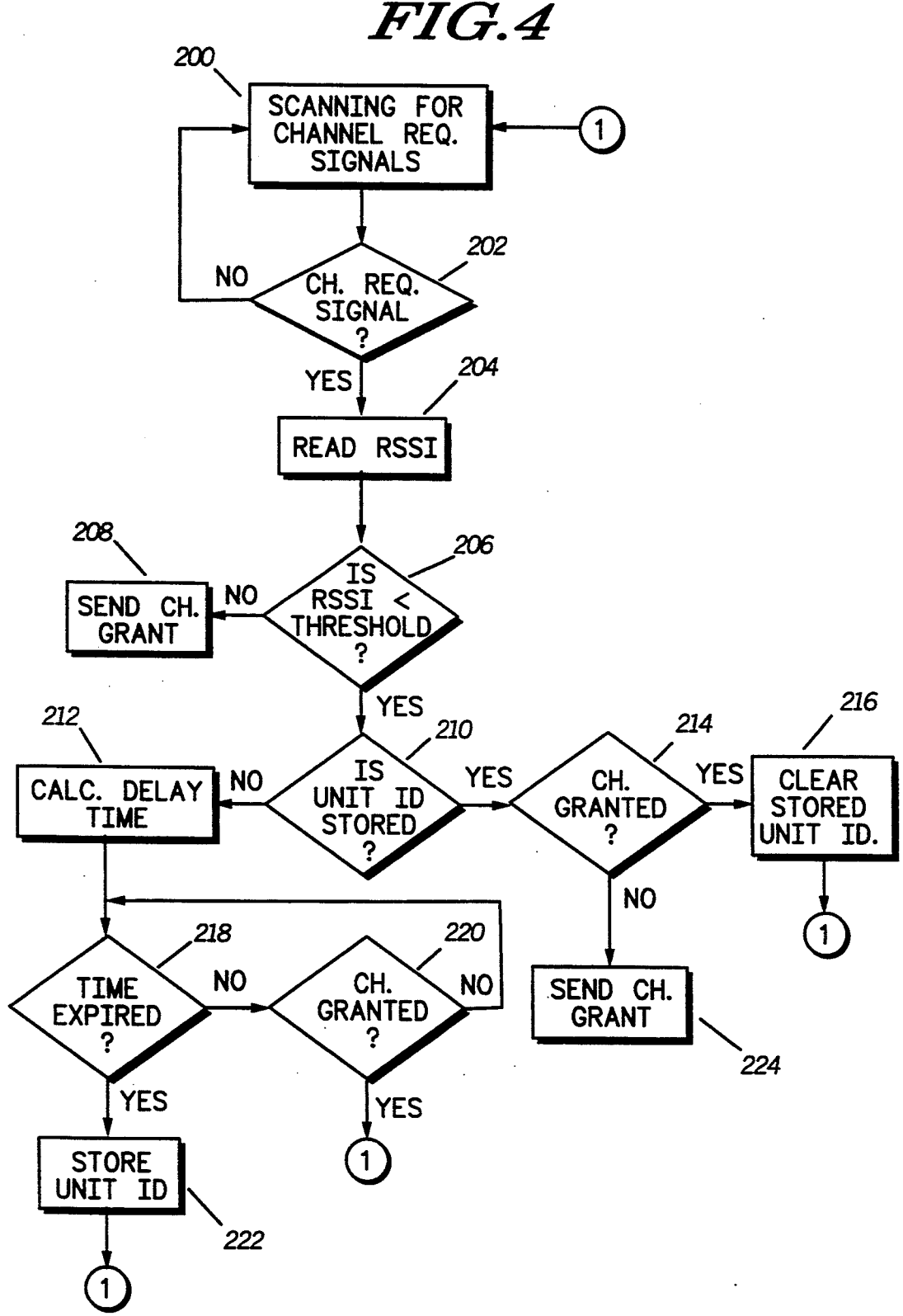
FIG. 4 is a flow chart of another channel acquisition method in accordance with the invention.

Referring to FIG. 4 there is shown a flow chart of another channel acquisition method in accordance with the invention. In step 200 the base site scans for channel request signals. A decision 202 is then made as to whether a valid channel request is detected (i.e., one containing the appropriate digital information). The base site continues to scan until a valid channel request signal is detected. In step 204, when the base site receives a channel request on a specific channel, it reads the RSSI of the received channel request signal. A decision 206 is then made as to whether the RSSI level measured in step 204 is below a predetermined threshold level. The predetermined threshold corresponds to the maximum distance from the base site required for establishing a communication link with that base site. If the RSSI is not below the threshold (i.e., it is at or above the threshold), a channel is granted to the requesting communication unit (step 208). If the measured RSSI is below the threshold, a decision 210 is made as to whether the identification number of the requesting communication unit has been stored. The identification number is included in the channel request signal. If the communication unit's identification number is not stored in the base site memory, the controller in the base calculates a delay time in step 212. The delay time is inversely proportional to the measured RSSI level. Thus, the higher the RSSI level, the shorter the delay. In decision 218 it is determined whether the delay time period has expired. If it has expired, the identification number (ID) of the requesting communication unit is stored in the base site memory in step 222, and the channel allocation process returns to step 200. If the delay time period has not expired, a decision 220 is made to determine whether a communication channel has been granted to the requesting unit by another base site or by another transceiver within the same base site. The base site may do this by detecting the synchronization data (i.e., the handshake information) transmitted by the communication unit when a channel has been granted to it.

In decision 210, if it is determined that the ID of the communication unit has been stored, then a decision 214 is made to determine whether a communication channel has been granted to the requesting communication unit by a second base site unit. If the channel was not granted, a channel grant is sent (224) to the communication unit. If decision 21 4 determines that the channel was granted, the communication unit ID is cleared from memory, and the channel allocation process returns to step 200.

Similarly, other base sites close enough to receive the channel request signals perform the above method. When one base site is closer to the requesting communication device than another, the closer base site has a shorter delay so that it will establish the communication link earlier than the more distant base. Once the farther base site detects the communication link between the communication unit and the closer base site (e.g., by detecting synchronization signals) it will not attempt to grant a communication channel to the communication unit. Therefore, the longer delay of the second base site allows the first base site to establish the desired communication link, and the problems arising from a more distant base site granting the channel request have been solved.

What is claimed is:

1. In a communication system having a plurality of base sites that are not synchronized with each other, the base sites capable of allocating a communication channel for use by a communication unit in response to a request from the communication unit, and any of the base sites receiving the request being capable of independently allocating the communication channel without regard to the availability of another base site that also has received the request from the requesting communication unit, a method for a base site to allocate a communication channel to a requesting communication unit, comprising the steps of:

receiving a request from a communication unit for a communication channel;

independently determining whether other base sites have begun communicating over a communication channel with the communication unit requesting the communication channel by detecting subsequent transmission of data from the communication unit to one of the other base sites; and allocating a communication channel to the communication unit requesting the communication channel after determining that other base sites have not begun communicating over the communication channel with the communication unit requesting the communication channel.

2. The method in accordance with claim 1, wherein the step of independently determining whether other base sites have begun communicating over a communication channel with the communication unit comprises detecting synchronization data being transmitted from the communication unit to one of the other base sites.

3. The method in accordance with claim 1, wherein the step of independently determining whether other base sites have begun communicating over a communication channel with the communication unit comprises detecting, after expiration of a time interval, whether synchronization data has been being transmitted from the communication unit to one of the other base sites.

4. The method in accordance with claim 1, wherein the step of independently determining whether other base sites have begun communicating over a communication channel with the communication unit comprises detecting handshake data being transmitted from the communication unit to one of the other base sites.

5. The method in accordance with claim 1, wherein the step of independently determining whether other base sites have begun communicating over a communication channel with the communication unit comprises detecting, after expiration of a time interval, whether handshake data has been transmitted from the communication unit to one of the other base sites.

6. The method in accordance with claim 1, which includes the step of performing a call authentication procedure on the request for a communication channel received from the communication unit.

7. The method in accordance with claim 1, which includes the step of responding to a service request included with the request for a communication channel received from the communication unit.

8. In a communication system having a plurality of base sites that are not synchronized with each other, the base sites capable of allocating a communication channel for use by a communication unit in response to a request from the communication unit, and any of the base sites receiving the request being capable of independently allocating the communication channel without regard to the availability of another base site that also has received the request from the requesting communication unit, a method for a base site to allocate a communication channel to a requesting communication unit, comprising the steps of:
receiving a request from a communication unit for a communication channel;
measuring the received signal strength level of the channel request signal;
independently determining, after expiration of a time interval, whether the requesting communication unit has begun communicating over a communication channel with one of the other base sites, the amount of time provided by the time interval is dependent on the measured received signal strength level; and
allocating the communication channel to the communication unit requesting the communication channel after determining that the requesting communication unit has not begun communicating over the communication channel with another base site.

9. The method in accordance with claim 8, wherein the step of independently determining, after expiration of a time interval, whether the requesting communication unit has begun communicating over a communication channel with one of the other base sites comprises detecting, after expiration of the time interval, synchronization data transmitted from the communication unit to one of the other base sites.

10. The method in accordance with claim 8, wherein the step of independently determining, after expiration of a time interval, whether the requesting communication unit has begun communicating over a communication channel with one of the other base sites comprises detecting, after expiration of the time interval, handshake data transmitted from the communication unit to one of the other base sites.

11. The method in accordance with claim 8, which includes the step of performing a call authentication procedure on the request for a communication channel received from the communication unit.

12. The method in accordance with claim 8, which includes the step of responding to a service request included with the request for a communication channel received from the communication unit.

13. In a communication system comprising a plurality of base sites that are not synchronized with each other, the base sites capable of allocating a communication channel for use by a communication unit in response to a request from the communication unit, and any of the base sites receiving the request being capable of independently allocating the communication channel without regard to the availability of another base site that also has received the request from the requesting communication unit, a method for allocating communication channels comprising the steps of:
with one of the communication units:
transmitting a channel request signal requesting a communication channel;
with one of the base sites:
receiving the channel request signal, the channel request signal having a received signal strength level;
measuring the received signal strength level of the channel request signal;
independently determining whether other base sites have begun communicating over a Communication channel with the communication unit requesting the communication channel by detecting subsequent transmission of data from the communication unit to one of the other base sites;
granting a communication channel to the communication unit that transmitted the channel request signal when the received signal level is above a first threshold to establish a communication link with the communication unit and after independently determining that the communication unit is not already communicating over the communication channel with another base site;
measuring the received signal level of signals received from the communication unit; and
maintaining the communication link as long as the received signal level of signals received from the communication unit is above a second threshold level having a value substantially lower than the value of the first threshold level.

14. The method in accordance with claim 13, wherein the step of independently determining that the communication unit is not already communicating over the communication channel with another base site comprises detecting synchronization data being transmitted from the communication unit to one of the other base sites.

15. The method in accordance with claim 13, wherein the step of independently determining that the communication unit is not already communicating over the communication channel with another base site comprises detecting, after expiration of a time interval, whether synchronization data has been being transmitted from the communication unit to one of the other base sites.

16. The method in accordance with claim 13, wherein the step of independently determining that the communication unit is not already communicating over the communication channel with another base site comprises detecting handshake data being transmitted from the communication unit to one of the other base sites.

17. The method in accordance with claim 13, wherein the step of independently determining that the communication unit is not already communicating over the communication channel with another base site comprises detecting, after expiration of a time interval, whether handshake data has been transmitted from the communication unit to one of the other base sites.

18. The method in accordance with claim 13, which includes the step of performing a call authentication procedure on the channel request signal received from the communication unit.

19. In a communication system comprising a plurality of base sites capable of scanning a plurality of communication channel in search of a request from a communication unit for allocation of a communication channel, and any of the base sites receiving the request being capable of independently allocating the communication channel without regard to the availability of another base site that also has received the request from the requesting communication unit, a method for allocating communication channels comprising the steps of:
 with one of the base sites:
  scanning the plurality of communication channels for channel request signals;
  detecting a channel request signal from a communication unit, the channel request signal having a received signal strength level;
  measuring the received signal strength level of the channel request signal received from the communication unit;
  independently determining, without receiving information from any other of the other base sties from among the plurality of base sites, whether the communication unit requesting the communication channel has transmitted synchronization data to another base site;
  granting a channel to the communication unit, and establishing a communication link with the communication unit, when the received signal level is above a predetermined threshold level and after independently determining that the communication unit has not transmitted synchronization data over the communication channel to another base site.

20. The method in accordance with claim 13, which includes the step of responding to a service request included with the channel request signal received from the communication unit.

21. The method in accordance with claim 19, wherein the step of independently determining whether the communication unit requesting the communication channel has transmitted synchronization data to another base site comprises detecting, after expiration of a time interval, whether synchronization data has been being transmitted from the communication unit to one of the other base sites.

22. The method in accordance with claim 19, which includes the step of performing a call authentication procedure on the channel request signal received from the communication unit.

23. The method in accordance with claim 19, which includes the step of responding to a service request included with the channel request signal received from the communication unit.

24. The method for allocating communication channels of claim 19, comprising the further step of:
 continuing scanning for channel request signals from other communication units after granting the channel to the communication unit requesting the channel.

25. In a communication system comprising a plurality of communication units and base sites, a method for allocating communication channels comprising the steps off
 with one of the base sites:
  (a) scanning for channel request signals;
  (b) detecting a channel request signal having a received signal strength level, from a communication unit, the channel request signal including an identification number corresponding to the communication unit;
  (c) measuring the received signal strength level of the channel request signal;
  (d) determining whether the channel request signal has a received signal strength level above a predetermined threshold;
  (e) granting a communication channel to the communication unit, when the channel request signal has a received signal level above the predetermined threshold;
  (f) determining whether the identification number has been stored;
  (g) calculating a delay time interval being inversely proportional to the received signal strength level when the identification number has not been stored;
  (h) determining whether the delay time period has expired;
  (i) storing the identification number, when the time period expires;
  (j) determining whether a communication channel has been allocated to the communication unit;
  (k) returning to step (a) when it is determined in step (j) that a communication channel has been allocated to the communication unit; and
  (l) returning to step (h) when a communication channel has not been allocated to the communication unit.

26. The method for allocating communication channels of claim 25, further comprising the following steps following step (f):
 (f1) determining whether a communication channel has been allocated to the communication unit, when the identification number has been stored;
 (f2) allocating a communication channel to the communication unit, when it is determined in step (f1) that a communication channel has not been allocated to the communication unit.

27. The method for allocating communication channels of claim 26, further comprising the steps of:
 (f3) clearing the identification number that was stored, when it is determined in step (f1) that a communication channel has been allocated to the communication unit; and
 (f4) returning to step (a).

* * * * *